3,389,393
LOW PROFILE BROADBAND MICROWAVE ANTENNA SYSTEM

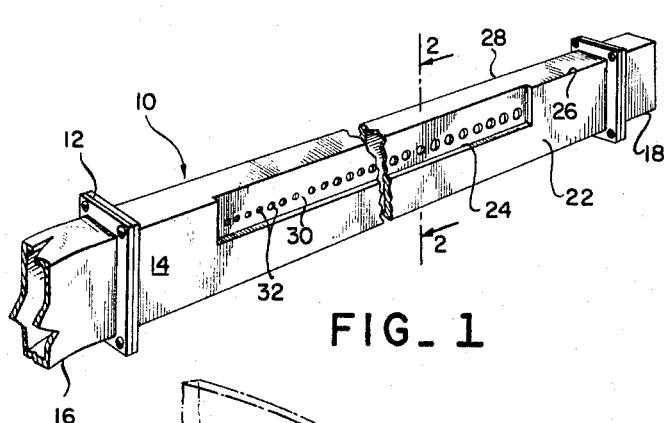
FIG_1
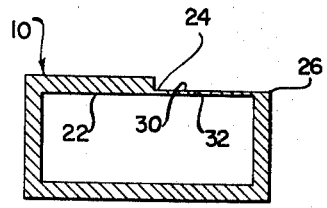
FIG_2
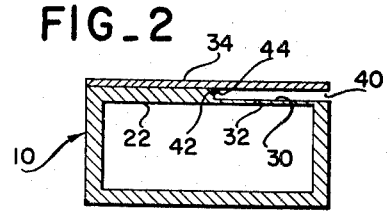
FIG_3
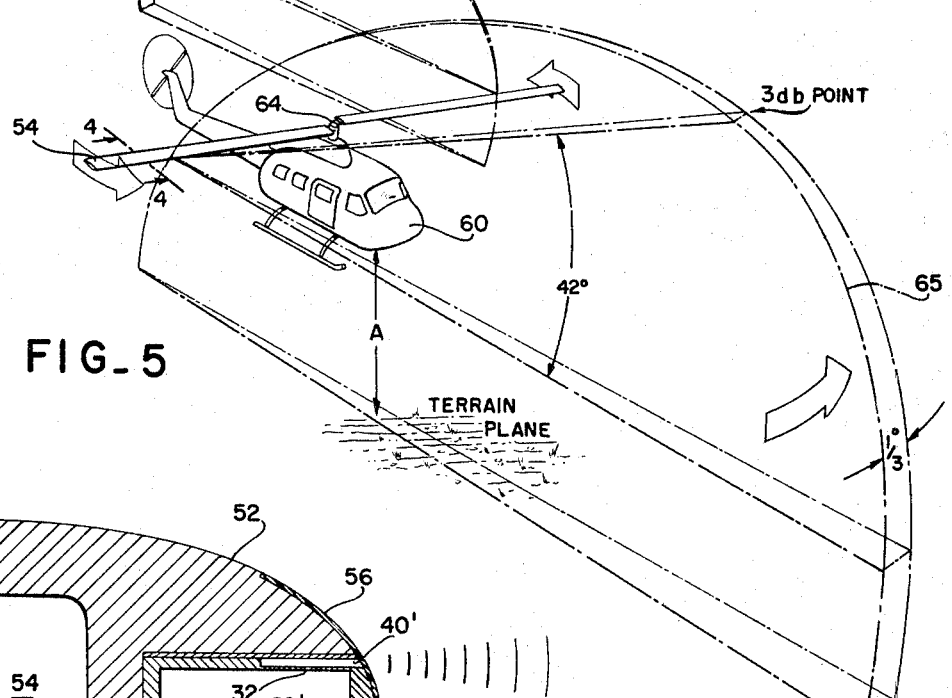
FIG_5
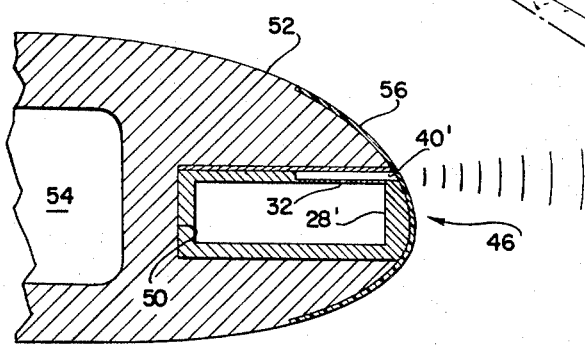
FIG_4

David W. Young, Jr., North Plainfield, N.J., assignor to Lockheed Aircraft Corporation, Burbank, Calif.
Filed Feb. 18, 1966, Ser. No. 528,425
11 Claims. (Cl. 343—708)

ABSTRACT OF THE DISCLOSURE

A broadband waveguide antenna suitable for helicopter rotor blade installations and the like wherein a wall portion of the waveguide is foraminated to form an array of a large number of below cut-off apertures through which energy is transferred in a leaky coupling mode resulting in a fan-shaped radiation beam pattern transversely of the longitudinal axis of the waveguide. A conductive plate secured to the waveguide and spaced from the foraminated wall portion in a parallel planes relationship protects the foraminated wall portion of the waveguide and provides a controlled width slit aperture minimizing the effects of other proximate conductive material on the radiation beam pattern.

---

This invention relates generally to directional microwave radar antennas and more particularly to broadband, narrow beam, foraminated elongate wall waveguide radiators.

Although the present invention exhibits particularly advantageous application in radar antennas mounted within helicopter rotor blades, and although, in the cause of brevity and clarity of presentation, much of the following discussion of examples of the invention are directed thereto, it is to be understood that the advantages of the invention are equally well manifest in other microwave antenna systems wherein a low profile compact high resolution broadband antenna is desired.

In modern helicopter operations, particularly but not necessarily military operations, it is often required that the flights be made at night or in inclement weather at high speed and at low altitude, i.e., typically at or below the level of treetops or other obstacles. With the advent of this type of helicopter utilization there has arisen the need for compact, lightweight high resolution close range radar systems which return data at a very high rate and which effectively penetrate rain, snow, fog, smoke, dust, and the like.

Previous attempts to solve this relatively severe radar problem have, in each instance known, resulted in providing a system which suffers from a serious compromise of one or more of these enumerated requirements. Most typically, providing a system with a scanning external antenna, which is mechanically adequately suited for helicopter use while at the same time meeting the desired electrical requirements, is the most difficult of these problems. High resolution is usually associated with high antenna gain or directivity which is in turn associated with large geometric parameters therefor. Furthermore, high rates of data return require high scanning rates. Accordingly, straightforward engineering approaches have typically involved a consideration of providing relatively large, rapidly rotating antennas and, because of the high air speed in which such craft operate, appropriate wind screening radomes were required.

These requirements of size and mass of the antenna and of the applied scanning mechanizations required are particularly difficult to meet in helicopter craft. These ships usually are required to be low to the ground while at rest thusly precluding elaborate antenna structure mounted below the craft, and those portions of the ship are, in military applications, typically totally used for armament and for windshield structure to permit forward visibility. The upper or superstructure portions of the craft are substantially totally taken up by the rotating wing structure. Other portions of the helicopter do not have sufficiently forward exposure for the mounting thereon of the scanning antenna structure. Furthermore, even if the size and weight problems of the antenna structure could be ignored the design of a suitable wind shielding radome for such structures on a 200-knot helicopter is in itself a highly severe problem.

The scanning mechanism for prior art high resolution antennas has also presented many problems of weight and bulk and mechanical complexity, each of which is particularly serious when considering its utilization in helicopters whose load and weight capacities and aerodynamic equilibrium capabilities are typically overtaxed even without carrying a bulky and massive rotating antenna.

Some attempts have been made to utilize stationary antennas which are scanned by electrical means. Some such attempts have shown considerable promise but their extra complexities and sometimes lower reliability for accurate results have resulted in their less than widespread acceptance as an adequate solution to the problems enumerated above.

Accordingly it is an object to provide a high resolution broadband antenna system which is not subject to these and other disadvantages and limitations of prior art systems.

It is another object to provide such a system which has an exceedingly low profile and which is correspondingly low in total mass and bulk.

It is another object to provide such a system which is mechanically scanned by the regular rotation of the helicopter rotor blade structure and mechanism and which thereby scans at the rate of several cycles per second.

It is another object to provide such an antenna system which may be mounted within the rotor blade at either the leading or trailing edges without materially affecting the latter's strength, weight or airfoil.

It is another object to provide such an antenna system which is not frequency sensitive over approximately a frequency octave with respect to the shape of its radiation pattern.

It is another object to provide such a system which is exceedingly light in weight, compact, mechanically rugged, reliable, electrically stable, and which does not require any sort of obtrusive radome structure.

It is another object to provide such an antenna system the radiation receiving characteristics of which are substantially independent of whether the antenna is mounted within the rotor blade or other airfoil or airflame structure or whether free standing, i.e., effectively clear of other structures.

Very briefly, these and other objects and advantages are achieved in one example of the invention which includes a length which may be a few hundred inches, of radiating waveguide terminated at one end by an absorptive load and coupled at the other end to a waveguide transmission line which is in turn coupled to the duplexing network of the radar transmitter-receiver. The radiating waveguide is coupled to space by an array of nonresonant coupling holes formed along the length of one broad wall of waveguide. The diameters of the holes cause them to be beyond cut-off apertures for the operating frequency. The transmission line thusly foraminated constitutes a "leaky" waveguide which may be thought of an though being inductively coupled to the surrounding space, since theoretically the holes are so small as to be beyond cut-off for the operating frequency of the microwave energy being coupled by the antenna.

The holes are, however, of such a cross-section and distribution as to cause an associated antenna radiation beam pattern which is fan-shaped, very narrow in the direction parallel to the length of the "leaky" waveguide array and very broad in its other, transverse dimension.

The array of coupling holes, in this example, is arranged in a long line along the length of one of the broad walls of the rectangular waveguide between its center line and one of the narrow waveguide walls. The antenna may then, in this example, be mounted in either or both the leading and trailing edges of the helicopter rotor blade with that same one of the narrow waveguide walls forming the actual leading or trailing edge of the blade. By using a plurality of antennas in a helicopter rotor blade system, the effective scan rate can be made a multiple of the rotor blade rotational velocity.

In a leading edge installation, a small forwardly exposed radiating aperture forming clearance is provided between the foraminated broad waveguide wall and remainder of the leading edge spar so that the leaky waveguide is coupled in an impedance matching, transitional manner to an elongated slit aperture which is in turn coupled to space ahead of the rotor blade.

A dielectric film may be formed over the slit aperture for weather and erosion protection.

The resulting non-resonant array radiator, which may be of the order of 200 inches in length, is, with respect to the beam shape and coupling characteristics of the antenna, substantially insensitive to frequency changes of the order of a full octave; i.e., the beam shape is not affected, and the power radiation distribution along the length of the array as well as the total power coupled by the antenna are not altered by such a frequency change. The direction of pointing of the fan beam can, however, be swept through a range of approximately 25 degrees with a frequency sweep from approximately 15 to 19 kilomegacycles.

Further details of these and other novel features and their principles of operation as well as additional objects and advantages of the invention will become apparent and be best understood from a consideration of the following description taken in connection with the accompanying drawing which is presented by way of an illustrative example only and in which:

FIGURE 1 is a perspective view, partially broken away of a portion of an example of a low profile broad-band microwave antenna system constructed in accordance with the principles of the present invention;

FIGURE 2 is a cross-sectional view of a portion of the structure shown in FIGURE 1 taken along the reference lines 2—2 thereof;

FIGURE 3 is a cross-sectional view like that of FIGURE 2 to which an additional component of the combination of the invention has been shown added;

FIGURE 4 is a cross-sectional view of a portion of an alternative example of a microwave antenna system constructed in accordance with the structural concepts of the invention; and FIGURE 5 is an overall perspective view of a helicopter craft embodying an example of the combination of the present invention.

With specific reference now to the figures in detail it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention, the description taken with the drawing making it apparent to those skilled in the microwave arts how the several forms of the invention may be embodied in practice. Specifically, the detailed showing is not to be taken as a limitation upon the scope of the invention which is defined by the appended claims forming, along with the drawing, a part of this specification.

In FIGURE 1 a simplified schematic-like presentation of an evample of a portion of a low profile, broad band microwave antenna system according to the invention is given. In this example, the antenna system includes a length of rectangular waveguide 10 having a coupling flange 12 affixed to its input end 14 which is thereby coupled through an input transmission line segment 16 to a radar receiver-transmitter console, not shown. At the opposite side of the waveguide 10 an absorptive load termination 18 may be connected by conventional means or, alternatively, microwave energy may be fed to the antenna from both ends. With energy applied to both ends of the antenna, two distinct beams can be produced, alternately or simultaneously.

The radiator waveguide 10 is, in this example dimensioned, regarding its rectangular cross-section, for operation in the microwave $k_q$ band. However, in accordance with the principles as embodied in a presently preferred practical example of the invention, the structural changes made in the $k_q$ waveguide cause it to be particularly adaptable for operation in the $k_u$ band of operation, as desired for the particular example being described.

This type of waveguide is typically provided with a wall thickness of approximately .040 inch. In this embodiment of the invention, however, a portion of the broad waveguide wall 22 is milled away to form a parallelepiped recess 24 between approximatley the center line of the broad wall 22 and the waveguide edge 26 which defines its boundary or junction with the narrow waveguide wall 28. In the region of the recess 24, the resulting thickness of the broad waveguide wall 22 is approximately .010 inch and this region of the broad wall may be denoted as a reduced thickness waveguide wall portion 30. In a typical example of this general type of embodiment of the invention, the length of the reduced thickness waveguide wall portion 30 is approximately 175 inches and its width is, of course, of the order of approximately ¼ inch, since the broad wall dimension of the $k_q$ waveguide is approximately ½ inch, typically.

Formed in the reduced thickness waveguide wall portion 30 is an array of small, below cut-off apertures which communicate from within the interior of the waveguide 10 to the space external thereto. The holes vary more or less continuously, in diameter from approxmiately .060 inch toward the input end 14 to approximately .100 inch toward the termination end, while the hole spacing from center to center varies in the same direction from approximately .200 inch to approximately .100 inch. This variation of hole diameter and spacing is indicated in a simplified, exaggerated manner in the figure. To be particularly noted, however, is that the line array of apertures is well spaced from the waveguide edge 26 toward the center line of the broad wall 22.

In operation the waveguide 10, when excited by a $k_u$ band microwave radiation fed thereinto from the transmission line 16, couples the microwave radiation to external space through the array of coupling holes in what may be considered a leaky mode of electromagnetic energy propagation between the waveguide and its external environment. It should be noted that the dimensions of the holes cause them to be clearly well below cut-off for the wave length of energy being propagated. Theoretically, the coupling holes 32, being below cut-off for the frequency of energy being propagated within the waveguide do not, by definition, couple the energy through the foraminated waveguide wall portion 30. However, it has been found that significant coupling is achieved and, as indicated previously, it may be considered a leaky mode type of coupling and the coupling process may be thought of as an inductive coupling between the propagation media of inside and outside the waveguide. The holes of the array normally would attenuate the microwave energy to the extent of approximately 50 db per inch of length of the holes. However, in practical embodiments constructed along the lines of the structure illustrated in FIGURE 1, it has been found empirically that the total loss is of the order of 1.68 db.

It should furthermore be noted that the array of coupling holes 32 is clearly not a resonant array. Again because of the small diameter of the holes and secondly because of their tight spacing. The holes 32 are on the average approximately 1/42 inch in diameter, and their center to center spacing is of the order of a seventh of an inch with a typical distribution of approximately 5 to 6 holes per inch. The holes are not critical in size, provided they are well below cut-off, and their placement and their distribution similarly is not critical, which effects are ramifications of the result of the array being a non-resonant structure. The particular hole size and spacing are tailored for the desired power distribution. In this connection, it may be pointed out that, if the holes are spaced too far apart, this causes the beam to break up into more beams (second order beams) and the angle of the beam with respect to the longitudinal axis of the array is affected. If the holes are made too large, they may become above cut-off for the frequency of operation.

Because of the non-resonant nature of the resulting radiator, the radiation performance thereof is highly insensitive to the placement thereover of a radome. In addition, the array is not frequency sensitive as regards the power distribution in the resulting beam or in the beam shape. The direction of pointing of the beam may, however, be controlled by frequency shifting. In this example of the invention, a 25 degree shift in direction is achieved by a frequency sweep from 15 to 19 kilomegacycles. When, on the other hand, an array of resonant slots is used in a configuration analogous to that illustrated in FIGURE 1, the power distribution as well as the relative coupling through the array is highly sensitive to frequency such that if the frequency is changed, the previously optimum coupling may be severely degraded so that the major portion of the microwave energy propagates on through the waveguide and must be terminated by the absorptive load. As is well known, the VSWR problems incumbent with such arrays are severely deleterious and often formidable.

In a particular example of the invention constructed along the lines of the structure illustrated in FIGURE 1, the total length of the reduced thickness portion 30 is approximately 175 inches long and the number of holes formed therein is approximately 1300.

Referring to FIGURE 2, a typical cross-section through the midportion of the length of waveguide 10 is illustrated. The broad wall portion 22 is seen to have been relieved externally through approximately its center line to its waveguide edge 26 to form a reduced thickness waveguide wall portion 30 through which the holes 32 are provided. As pointed out above, the thickness of the portion 30 may, in a practical example, be of the order of .010 inch while that of the non-reduced portions is typically .040 inch.

Referring to FIGURE 3, the structure illustrated may be considered to be identical with that shown in FIGURE 2, except that a thin, rigid, conductive plate 34 is shown affixed rigidly, as by soldering, to the non-reduced thickness waveguide wall portion and coextending in a parallel plane, juxtaposed relationship with the reduced thickness portion 30. The conductive plate 34 may be added, when desired, for purposes of providing protection for the reduced thickness wall portion 30 as well as to provide a controlled width, slit type aperture 40 which, in this example, is the ultimate radiator of the microwave energy fed to the system through the waveguide 10. In this connection, it has been found in some examples that the effective width of the slit aperture 40 is critical in the performance of the radiating system. The rigid connection, therefore, of the conductive plate 34 in the manner illustrated has been found to be particularly useful in causing the slit width to be predetermined and constant irrespective of other proximate conductive material. It has also been discovered that a definite and positive short circuit between the conductive plate and the upper edge of the step 42 between the non-reduced and reduced thickness portions of the broad wall 22 is helpful and may be provided by a continuous bead of solder as indicated at 44. The solder need not be a bead, per se, but when desired, such can assure the required continuity.

Referring to FIGURE 4, an example of the invention is illustrated in which a waveguide radiator 46 much like that illustrated in the previous figures is inserted in a waveguide receiving slot 50 relieved as shown from the tip of the leading edge spar 52 of a helicopter rotary wing 54. The difference to be noted is that the narrow waveguide wall 28' in this particular example is formed as shown to provide the appropriate contour for continuing the airfoil leading edge of the spar 52. A dielectric boot 56 may be provided as shown to protect the radiating slit type aperture 40' from weather and erosion. The material of the dielectric boot may be neoprene, estane, or the like, as deemed appropriate for the particular applications and needs of the user.

In FIGURE 5 a helicopter craft 60 is shown in a simplified pictorial manner which is airborne at an altitude A above the terrain plane as indicated. The helicopter craft 60 includes a set of rotating wings 54, a partial cross-section through one thereof comprising the representation of FIGURE 4 discussed above.

In operation the fan type antenna beams 65 are, as indicated, quite wide in the vertical dimension and exceedingly narrow in their horizontal wdth. In a practical embodiment, the antenna width at 5000 feet of range is approximately one-third (1/3) degree while one-half the vertical antenna beam width, between the 3 db power points, is approximately 42 degrees. Furthermore, the beam direction is canted from the broadside towards the direction of energy propagation in the waveguide of the antenna (approximately 30° at 16.2 kilomegacycles), and the elevation pattern shape of the beam may be slightly conical with the angle of the cone being a function of the operating frequency. The lower the frequency, the more planar the elevation pattern shape of the beam. As indicated in FIGURE 5, the beam scanning is achieved inherently by the rotation of the helicopter blades whose typical angular velocity is of the order of 5 cycles per second. The effective scan rate of the radiated energy may be made a multiple of the angular velocity of the helicopter rotor blades by such techniques as using two or more antennas at the leading and trailing edges of the rotor blades, as previously mentioned. Similar results may also be achieved, for example, by feeding one or more of the antennas through both ends to produce more than one distinct radiated energy beam per antenna.

The antenna feed has been found to be usefully and desirably made through the hollow hub 64 of the rotary wing assembly of the helicopter 60 with flexible waveguide lengths from the interior of the hub to the connection such as flange 12 (see FIGURE 1).

There has thus been disclosed and described a number of examples of the various structural aspects of the invention which achieve the objects and exhibit the advantages set forth hereinabove.

What is claimed is:

1. A microwave antenna system for transferring electromagnetic energy in a predetermined microwave frequency range, said system comprising:

a length of rigid, conductive wall waveguide having internal dimensions for propagating said microwave energy in a fundamental waveguide mode along the length thereof, a conductive plate secured along at least a portion of its length to said waveguide and supported in generally parallel spaced relation with a wall portion thereof to form a slit aperture, said wall portion being foraminated to form therein an array of a large number of leaky coupling mode, below cut-off apertures communicating with said slit aperture through the gap provided between the waveguide and said conductive plate.

2. The invention according to claim 1 in which said length of waveguide is of rectangular waveguide and said array of apertures are disposed substantially in a line at least approximately parallel to the length of said waveguide.

3. The invention according to claim 2 in which said apertures are spaced by a longitudinal distance which is of the order of magnitude of the diameters of said apertures.

4. The invention according to claim 1 in which said length of waveguide includes input coupling means disposed at one end thereof and termination means disposed in microwave energy absorptive relation therewith at the opposite end thereof.

5. The invention according to claim 1 in which said length of waveguide is rectangular and said wall portion is conductive and has a thickness of the order of 0.10 inch.

6. The invention according to claim 5 in which said wall portion is a portion of one of the broad walls of said length of rectangular waveguide.

7. A microwave antenna system for transferring electromagnetic energy in a predetermined microwave frequency range, said system comprising:
a length of rigid, conductive wall waveguide having internal dimensions for propagating said microwave energy in a fundamental waveguide mode along the length thereof,
said length of waveguide being rectangular and having a broad conductive wall and a narrow conductive wall joined thereto along a waveguide edge;
said broad wall having a reduced thickness for at least a portion of its length over at least a predetermined portion of its area disposed contiguously along said waveguide edge;
said predetermined portion of its area being foraminated to define an array of a large number of leaky coupling mode, below cut-off apertures through said predetermined wall portion.

8. The invention according to claim 7 in which said broad conductive wall includes a non-reduced thickness portion and a step transition parallel to said waveguide edge between said reduced and non-reduced thickness portions of said broad wall.

9. The invention according to claim 8 which further includes a conductive plate affixed to said non-reduced thickness portion and extending in a juxtaposed parallel planes relation with said reduced thickness portion thereby forming an elongate slit aperture disposed adjacently to said waveguide edge intercoupled between said array of leaky mode, below cut-off apertures and the dielectric space external to said waveguide.

10. The invention according to claim 9 which further includes a rotor having a leading edge relieved along its length to form a waveguide receiving channel to receive said length of waveguide with said narrow waveguide wall being disposed substantially flush with the contour of the forwardly exposed surface of said leading edge of said rotor.

11. A radar scanning antenna system for a plurality of rotor blades comprising:
a plurality of lengths of conductive waveguide having internal dimensions for propagating electromagnetic energy therethrough in a fundamental mode,
each said length of waveguide being rectangular and having a broad conductive wall and a narrow conductive wall joined thereto along a waveguide edge;
said broad wall being foraminated to form therein an array of a large number of leaky coupling mode below cut-off apertures; and
a conductive plate affixed at least a portion of its length to each said length of waveguide and extending over said aperture in a spaced parallel planes relation with said broad wall thereby forming a cavity terminating in an elongate slit aperture disposed adjacently to said waveguide edge whereby energy transfer through said apertures results in a fan-shaped radiation beam pattern in a direction generally transverse to the longitudinal axis of the waveguide;
said lengths of waveguide being spaced apart and recessed within at least one of said rotor blades to provide an effective scan rate which is a multiple of the rotational velocity of said rotor blades.

References Cited

UNITED STATES PATENTS

| | | | |
|---|---|---|---|
| 2,607,894 | 8/1952 | Johnson | 343—708 |
| 2,807,800 | 9/1957 | Broussaud | 343—771 |
| 3,139,617 | 6/1964 | Denman et al. | 343—6 X |
| 3,144,646 | 11/1964 | Breithaupt | 343—708 X |
| 3,308,467 | 3/1967 | Morrison | 343—705 |

RODNEY D. BENNETT, *Primary Examiner.*

RICHARD A. FARLEY, *Examiner.*

H. C. WAMSLEY, *Assistant Examiner.*